United States Patent [19]

Acton et al.

[11] 4,171,564
[45] Oct. 23, 1979

[54] METHOD OF MANUFACTURING ELECTRIC BATTERIES WITH HEAT EMBEDDED INTERCELL CONNECTORS

[75] Inventors: Richard G. Acton, Prestbury; Harold Morton, Audenshaw, both of England

[73] Assignee: Oldham and Son Ltd., Denton, England

[21] Appl. No.: 860,413

[22] Filed: Dec. 13, 1977

[30] Foreign Application Priority Data

Dec. 14, 1976 [GB] United Kingdom ............... 52154/76

[51] Int. Cl.$^2$ ........................................... H01M 10/38
[52] U.S. Cl. .................................. 29/623.2; 156/303.1; 264/249; 264/272; 429/160
[58] Field of Search ........................... 29/623.2, 623.1; 429/160; 156/303.1, 322; 264/249, 272

[56] References Cited

U.S. PATENT DOCUMENTS

| | | | |
|---|---|---|---|
| 1,919,902 | 7/1933 | Nyce | 429/160 |
| 3,189,672 | 6/1965 | Lyman, Jr. | 264/249 |
| 3,323,966 | 6/1967 | Schimmel | 156/322 |
| 3,388,005 | 6/1968 | Hahn et al. | 429/160 |
| 3,764,393 | 10/1973 | Fujimoto | 429/160 |
| 3,821,029 | 6/1974 | Smith | 429/160 |

*Primary Examiner*—Francis S. Husar
*Assistant Examiner*—Daniel C. Crane
*Attorney, Agent, or Firm*—Sughrue, Rothwell, Mion, Zinn and Macpeak

[57] ABSTRACT

An electric storage battery having a plurality of cell compartments separated from each other by wall means formed of thermoplastic plastics material, each cell compartment containing a plurality of plates electrically connected together, the plates of one cell compartment being electrically connected to the plates in an adjacent cell compartment by an intercell connecting rod which provides a direct connection between adjacent cells through the wall means, the rod having been embedded in position in the wall means by deformation of the wall means when the thermoplastic plastics material was softened by heat.

7 Claims, 13 Drawing Figures

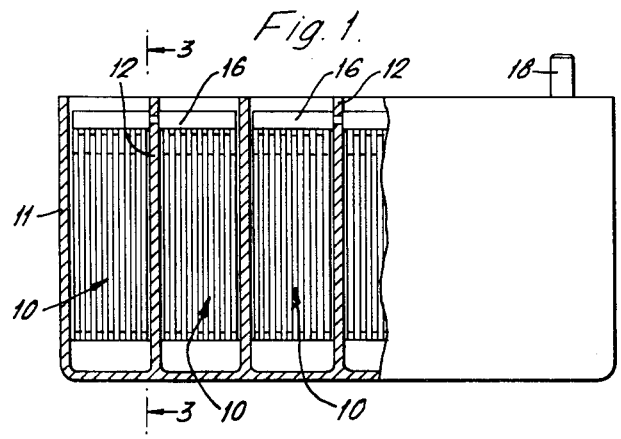
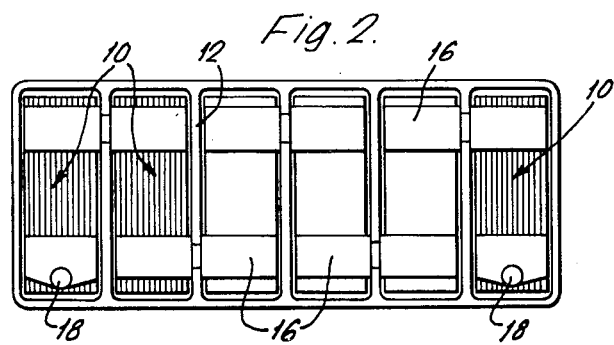
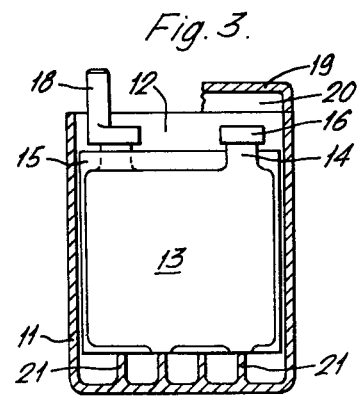

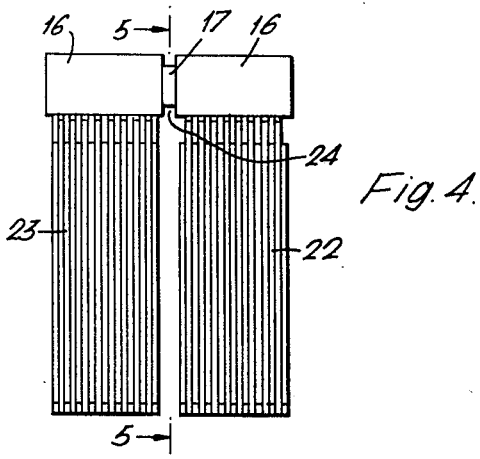
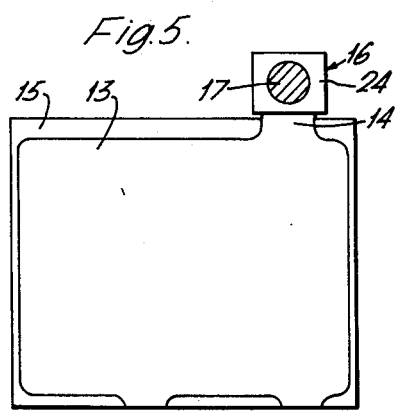
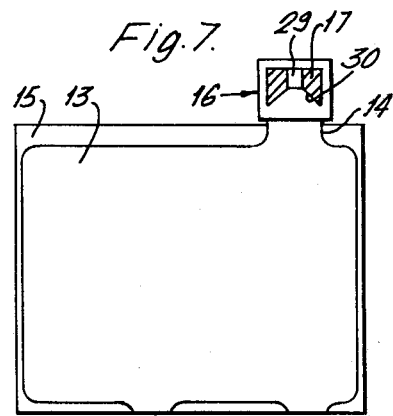
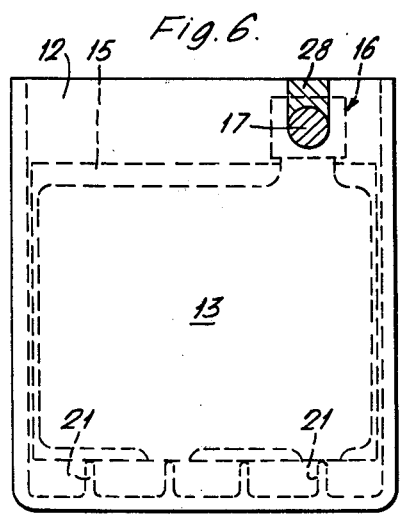
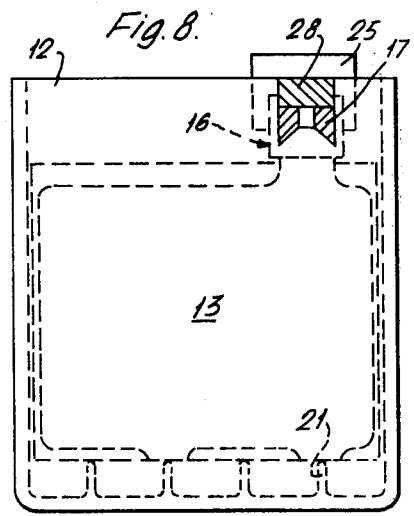

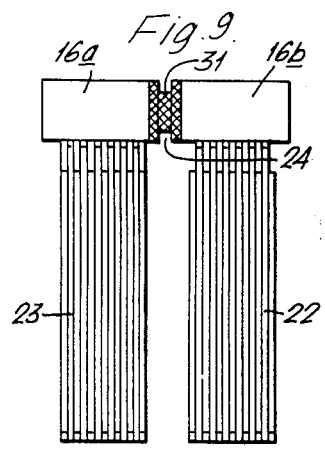
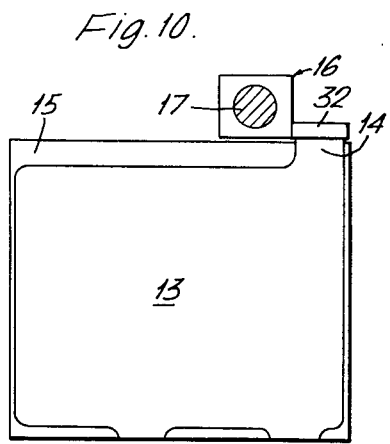
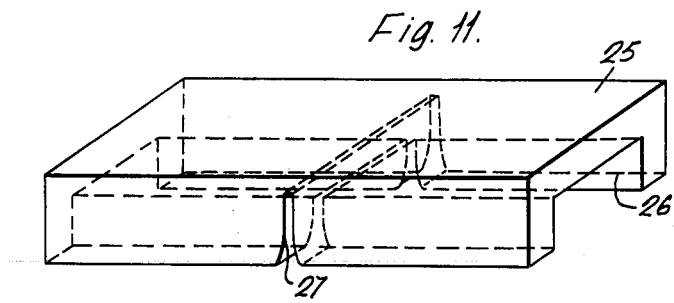
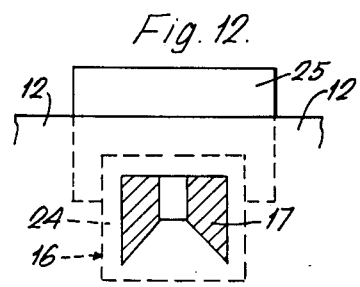
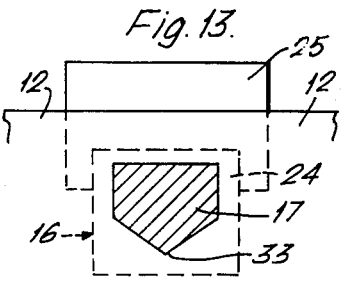

METHOD OF MANUFACTURING ELECTRIC BATTERIES WITH HEAT EMBEDDED INTERCELL CONNECTORS

BACKGROUND OF THE INVENTION

The invention relates to electric storage batteries and in particular to electric storage batteries having two or more cell compartments separated by partition walls formed of thermoplastic plastics material.

The invention is particularly applicable in the manufacture of multicell storage batteries such as for example lead acid batteries, of the kind comprising a case or cases divided into cell compartments by internal partition walls, with a group of plates in each cell compartment. The plates in each cell compartment are electrically connected together and connected to the plates in an adjacent cell compartment by an intercell connector which, in previously known batteries has commonly passed over the top of the partition wall or alternatively through a hole in the partition wall thereby forming a direct connection through the partition wall. Direct connections through the partition wall are advantageous in using less material in the interconnecting rod which may for example be formed of a lead alloy. This minimises the conducting path thereby decreasing the overall resistance within the battery and improving the battery efficiency. However, problems can arise in making a satisfactory connection through the partition wall and effecting a satisfactory seal at the point where the interconnection is made through the partition wall.

It is an object of the present invention to provide improved means of providing an intercell connection which passes directly through the partition wall or walls in electric storage batteries having partition walls formed of thermoplastic resin.

SUMMARY OF THE INVENTION

The invention provides a method of forming an intercell connection in an electric storage battery having at least two cell compartments separated from each other by wall means formed of thermoplastic plastics material and each containing a plurality of plates, which method comprises connecting the plates of two adjacent cell compartments to opposite ends of a metal intercell connecting rod in electrical connection therewith, positioning the rod across the top of the wall means with the plates projecting into their respective cell compartments, applying heat to the region of the wall means adjacent the connecting rod to soften the thermoplastic material and causing relative movement between the rod and the wall means so that the rod displaces softened thermoplastic plastics material and becomes embedded in the wall means, terminating the relative movement when the plates and interconnecting rod have reached the required position, and then permitting the thermoplastic plastics material to cool, thereby setting to hold the rod in position and forming a seal against the rod.

Preferably heat is applied to the rod as well as the thermoplastic material to avoid chilling the softened plastics material and conveniently heat is applied to the thermoplastic material through the rod.

In some cases the thermoplastic plastics material may soften to such an extent that the rod and connected plates may move downwards under their own weight. However, pressure may be applied, where necessary, to the connecting rod to move it downwards into the softened thermoplastic material.

Commonly the battery is provided with a plurality of cell compartments within a common casing, each cell compartment being separated from the adjacent cell compartment by a single partition wall. In other cases however each cell may be provided in a separate casing and the adjacent cell compartments may be separated from each other by two adjacent casing walls.

Preferably the interconnecting rod is moved downwards in the partition wall to a position where the upper edge of the rod is below the upper edge of the partition wall.

Preferably the space in the partition wall above the connecting rod when the rod has been moved down into position is sealed by suitable sealing means to a level flush with the top of the partition wall.

In this way, a cover may subsequently be sealed to the battery casing, the cover including partition members which may be welded to the upper edge of each associated partition wall in the casing, thereby sealing adjacent cells from each other.

Preferably the connecting rod is formed with a groove or recess around at least part of its periphery adjacent the partition wall so that the softened plastics material enters the groove and on setting, the plastics material forms a good seal against the rod around the groove or recess.

Preferably the groove or recess is arranged so that as the rod is moved downwards, softened plastics material which is displaced is caused the flow upwards through the groove to provide plastics material above the rod.

Preferably a mould is positioned around the rod and the partition wall when the rod is caused to move downwards into the softened plastics material, the mould being shaped to match the shape of the rod and thickness of the wall so that softened plastics material which is displaced by the downward movement of the rod is caused to rise above the rod and enter the mould thereby providing a wall member above the rod flush with the top of the partition wall and forming a complete seal around the connecting rod.

In some cases additional plastics material may be required to complete the wall member above the rod. The additional plastics material may be located in the mould when it is moved downwards to depress the rod or in a subsequent lowering operation of the mould. Alternatively additional plastics material may be injected into position through the mould or an additional plastics member, such as a U-piece may be located over the partition wall before the mould is moved into position.

Preferably the heat to soften the thermoplastic plastics material is applied through the mould.

Preferably the thermoplastic plastics material is heated to a temperature such that the displaced plastics material welds together with itself on encircling the connecting rod.

In some cases the connecting rod may be provided with a passage passing through the rod from its lower face to its upper face in the region of the partition wall so that displaced thermoplastic plastics material is caused to flow upwards through said passage on downward movement of the rod to provide plastics material to seal across the top of the rod and thereby complete the partition wall.

The aforesaid method is particularly applicable to the manufacture of lead acid storage batteries having a casing of thermoplastic resin.

The invention also provides an electric storage battery having a plurality of cell compartments separated from each other by wall means formed of thermoplastic plastics material each cell compartment containing a plurality of plates electrically connected together, the plates of one cell compartment being electrically connected to the plates in an adjacent cell compartment by an intercell connecting rod which provides a direct connection between adjacent cells through the wall means, the rod having been embedded in position in the wall means by deformation of the wall means when the thermoplastic plastics material was softened by heat.

Preferably the rod interconnecting two adjacent cells is formed as a unitary connecting rod. Preferably the rod is straight.

Preferably the wall means comprises an intercell partition wall and the rod has a reduced cross section providing a groove around part of its periphery adjacent the partition wall.

Preferably the rod is embedded in position below the top edge of the partition wall and a sealing member extends across the top of the rod in sealing engagement therewith.

Preferably the sealing member is provided by thermoplastic material which was displaced by the movement embedding the rod in position, the thermoplastic plastics material thereby completing the partition wall across the top of the embedded rod in sealing engagement therewith.

Preferably the reduced cross section of the rod adjacent the wall has a shape arranged to facilitate flow of thermoplastic material from below the rod to a position above the rod whereby displaced thermoplastic material may complete the partition wall above the rod. Preferably the region of reduced cross section has a circular or oval cross section.

BRIEF DESCRIPTION OF THE DRAWINGS

FIG. 1 is a partially sectioned side elevation of a lead acid storage battery in accordance with the invention.

FIG. 2 is a plan view of the battery shown in FIG. 1 with the cover removed,

FIG. 3 is a section on the line 3—3 in FIG. 1,

FIG. 4 shows two groups of plates attached to a common intercell connecting rod ready for use with the present invention, FIG. 5 is a section on the line 5—5 in FIG. 4, FIG. 6 shows the assembly of FIG. 5 when mounted in a battery casing, FIG. 7 is a view similar to FIG. 5 showing an alternative construction of intercell connecting rod, FIG. 8 shows the arrangement of FIG. 7 when mounted in a battery casing during manufacture, FIG. 9 is a view similar to FIG. 4 showing a modified form of intercell connection, FIG. 10 is a view similar to FIG. 5 showing a further modified intercell connecting arrangement, FIG. 11 shows a mould for use in manufacturing an electric storage battery in accordance with the present invention, FIG. 12 is a diagrammatic view of a mould similar to that of FIG. 11 in use with an intercell connecting rod, and FIG. 13 is a view similar to FIG. 12 using a different configuration of intercell connecting rod.

DESCRIPTION OF THE PREFERRED EMBODIMENTS

The examples shown in FIGS. 1, 2 and 3 consist of a lead acid storage battery having a plurality of cell compartments 10 spaced along the battery. The unitary battery casing 11 is formed of thermoplastic resin and the casing has integral partition walls 12, also formed of thermoplastic plastics material, between each of the cell compartments. In the example the thermoplastic resin comprises polypropylene. The cell compartments each house a group of six plates 12 having connecting lugs 14 at their upper ends. The plates 13 are interleaved with separators 15 in such a way that all the positive plate lugs are at one side of the battery and the negative plate lugs are at the other side. In order to connect the plates in one cell compartment with the plates in an adjacent cell compartment, a plurality of intercell connecting rods 16 are provided. The rods 16 are formed of metal such as a lead alloy. Each connecting rod 16 is formed as a single straight piece and is long enough to interconnect the plates in two adjacent cell compartments. The lugs of the plates in one cell are connected to one end of the connecting rod 16 while the lugs of the plates in the adjacent cell are connected to the other end of the rod 16. This is shown clearly in FIG. 4. The central region 17 of the connecting rod which is arranged to pass directly through the partition wall 12 is formed with a reduced cross section as is shown in FIG. 4. The plates in adjacent compartments are assembled in the opposite sense so that each rod 16 is connected to negative plates in one compartment and positive plates in the adjacent compartment. The example shown in FIG. 1 shows a 12 volt battery assembly in which six plate groups are used and five intercell connecting rods 16 are used. At opposite ends of the battery, terminal posts 18 are provided for providing the main connections to the battery. As can be seen from FIGS. 1 and 3, the partition walls 12 all terminate in the same common horizontal plane at the top of the casing so that a cover 19 (partly shown in FIG. 3) may be welded onto the top of the battery casing with partition walls 20 in the cover being welded to corresponding partition walls 12 in the casing 11 thereby sealing adjacent cells from each other. Each cell compartment contains electrolyte.

As can be seen from FIGS. 1 to 3, each intercell connecting rod 16 is formed as a single straight rod which passes directly through the partition wall 12 separating the two cells associated with the connecting rod. The rod is embedded in the partition wall 12 by deformation of the thermoplastic material when in a softened condition due to the application of heat. This will be described more fully below. As can be seen from FIGS. 2 and 3, the lugs 14 on each plate are welded to the rod 16 and the rod is arranged to pass through the partition wall 12 below the top edge of the partition wall so that the lower edges of the plates rest on supporting ribs 21 at the bottom of the battery casing 11. The partition wall is arranged to seal tightly around the rod 16 at the point where the rod passes through the partition wall so that leakage between adjacent cell compartments is prevented.

The manner of mounting the plates 13 and conducting rods 16 in position in the battery casing will now be described. Firstly, two groups of plates 22 and 23 are welded to opposite ends of a connecting rod 16 as is shown in FIG. 4. The central region 17 of the connecting rod has a reduced cross section as shown in FIGS.

4 and 5 so that a narrow groove 24 extends around the connecting rod in the region adjacent the partition wall 12. The assembly shown in FIG. 4 is then located in position in a battery casing with the two groups of plates 22 and 23 projecting down into respective cell compartments with the groove 24 in the rod 16 resting on top of the associated partition wall 12. A mould 25 of the type shown in FIG. 11 is then placed over the connecting rod 16. As shown in FIG. 11, the mould consists of a substantially rectangular metal block, for example brass, having a rectangular channel 26 formed along its lower face. This channel is adapted to fit over the rectangular connecting rod 16. The mould also has a narrow channel 27 extending across the block transverse to the channel 26. The channel 27 forms a deeper recess in the block than the channel 26. The recess 27 is adapted to fit over the top of the partition wall 12. In use, the mould when fitted over the connecting rod 16 is heated by electrical induction heating or by a heated pad lying on top of the mould. The heat passes down through the mould and metal rod 16 so as to heat the thermoplastic material in the upper part of the partition wall 12. Pressure may then be applied to the mould to cause the assembly shown in FIG. 4 to move downwards into the partition wall displacing softened thermoplastic material. In the case of using polypropylene for the partition walls 12, the heating applied through the mould 25 may be arranged to heat the thermoplastic material to between 160° and 250°. This causes the polypropylene to melt in contact with the connecting rod 16 and in some cases the weight of the assembly shown in FIG. 4 together with the mould 25 may be sufficient to cause the downward movement of the assembly into position in the partition wall without additional pressure being applied to the mould. The assembly moves downwards until the lower edges of the plates rest on the ribs 21 along the bottom of the battery casing and at this position, as shown in FIG. 6, the upper edge of the rod 16 is positioned below (for example at least 3 to 4 mm below) the upper edge of the partition wall 12. The softened thermoplastic material which has been displaced by the downward movement of the rod 16 is caused to flow through the groove 24 around the central portion of the rod 16 and thereby flows upwards into available space in the recess 27 formed in the mould 25. This plastic then fills the space marked 28 in FIG. 6 thereby completing the partition wall above the rod 16. In this particular example the mould is so shaped and arranged that the displaced thermoplastic material exactly fills this space forming a tight seal around the entire circumference of the groove 24 in the rod 16 and completely closes the gap above the rod flush with the top of the partition wall 12. In some cases additional thermoplastic material may be needed to fill the space 28 and form a good seal. This may be supplied either by injection into the space above the rod or by placing additional thermoplastic material over the partition wall or in the mould. In the case of the mould shown in FIG. 11, the slot 27 is generally narrower in width than the thickness of the partition wall. The lower open edge of the slot 27 is outwardly flared to assist initial entry of the upper edge of the partition wall into the slot 27. As heat is applied to soften the plastics material, the mould moves downwards and the partition wall is effectively squeezed in the narrow slot 27 and this assists in filling the space left by the sinking rod 16 and pressure is applied to the softened plastics material to achieve a good seal against the rod 16. It may be desirable in some cases to avoid the use of the mould 25 shown in FIG. 11 and in this case the gap above the rod 16 can be filled in sealing engagement with the rod by injection of thermoplastic plastics material into the gap or a small piece of material can be welded or cemented in position but in all cases the gap above the rod must be filled so as to form a seal between the connecting rod and the partition wall 12. When the assembly has reached the position shown in FIG. 6, the mould 25 can be cooled so that the thermoplastic material cools to below 80° C. and sets thereby rigidly holding the connecting rod 16 in position and forming a tight seal in the groove 24 around the entire periphery of the rod 16. The mould 25 can then be removed. This process is repeated when mounting each set of plates and associated connecting rod 16 is in position.

The reduced central region 17 of the rod 16 is preferably circular as shown in FIGS. 5 and 6, or oval, as this results in a better seal between the thermoplastic material and the rod.

Other configurations of connecting rod 16 may however be used including flat sided central regions 17. FIGS. 7 and 8 show an example in which the connecting rod 16 has a flat-sided central region 17 of reduced cross section with a central vertical passage 29 leading to an outwardly flared recess 30 in the lower edge of the central region 17. In this case, the mould 25 may be used as previously described and this is shown in FIG. 8. On downward movement of the connecting rod 16 through the softened thermoplastic material, the flared region 30 forces softened thermoplastic material towards the passage 29 where the material then flows vertically upwards to fill the space 28 above the rod 16.

Although in the preferred embodiments the rod 16 is formed as a single unitary rod interconnecting the plates of two adjacent cell compartments, it may in some cases be desirable to use two separate rods connected by a suitably shaped intermediate member. Such an example is shown in FIG. 9. In this case, the rod 16 has two halves 16a and 16b connected respectively to the groups of plates 23 and 22. An intermediate lead alloy member 31 is positioned between the two parts of the rod and welded to both of them. This intermediate member 31 has a groove 24 similar to that already described with reference to FIG. 4 or that shown in FIGS. 12 or 13.

In the examples described so far, the connecting rod 16 is positioned in line with the lugs 14 on each of the plates. It is however possible to mount the rod 16 in a position which is offset to one side of the lugs 14 as is shown in FIG. 10 by the use of a precast slug 32 which is welded to one side of the bar and interconnects the lugs of the group of plates.

The particular shape of the grooved central region of the conducting bar used in FIG. 7 is shown more clearly in FIG. 12. In this particular example it is shown in position in a mould 25, the mould being located on the partition wall 12. It can be seen that the groove 27 in the mould (shown in FIG. 11) extends sufficiently high in the mould to allow the assembly to drop to a position where the rod 16 is positioned well below the top of the partition wall 12. Although this is the preferred arrangement, it may be desirable in some cases to arrange that the rod 16 is finally positioned with its top surface substantially flush with the top of the partition wall 12. In such a case the lid of the battery may be welded into position so that partitions in the lid form a suitable seal against the top edge of the connecting rod 16. The top face of the connecting rod 16 may still be provided with a recess or groove into which a partition in the cover may project and thereby form an effective seal.

Although the above method of inserting a connecting rod into the partition wall has been described with reference to one rod alone, the preferred method of assembly of the entire battery involves the preparation of assembly similar to that shown in FIG. 4 for each pair of cell compartments and the whole assembly of plates and conducting rods is then lowered into a thermoplastic container with the intercell connecting bars resting on the associated partition walls. The heating and moulding operation is then carried out simultaneously for each of the connecting rods 16.

FIG. 13 shows a further alternative shape for the central region 17 of the connecting rod 16. In this case the central part 17 is generally similar to that shown in FIG. 4 although the two lower corners are removed so as to provide a downwardly directed point 33. This may in some cases assist in displacing softened thermoplastic material and causing it to flow upwardly through the groove to a position above the rod 16.

It will be appreciated that the above preferred examples provide an advantageous way of forming intercell connections directly through the partition walls. Straight conducting rods are used thereby requiring less lead alloy compared with arrangements which have conducting rods passing over the partition walls. This also minimises the conducting path thereby reducing the resistance within the battery. In the case using a single one piece connecting rod for each pair of adjacent cells, more reliable connection is provided by avoiding welded junctions adjacent the partition wall. The equipment needed to manufacture the intercell connection is extremely simple and avoids the need for precast components for use in forming the intercell connection. Furthermore, it avoids the necessity to form holes or slots in the partition wall to allow passage of the connection through the wall.

The invention is not limited to the details of the foregoing examples. Although the particular examples described relate to a lead acid storage battery, the invention is applicable to other multicell batteries requiring intercell connections through thermoplastic walls. The various cells may in some examples be provided in separate casings so that the connecting rods interconnecting two adjacent cells may pass through two adjacent casing walls formed of thermoplastic plastics material. The material used for the connecting rod 13 is in the preferred example a lead alloy but this can be varied to suit the type of battery being made provided that it has a melting point well above that of the thermoplastic plastics material.

Although various shapes of interconnecting rod have been shown, other shapes are possible. For instance, the central section of reduced cross section may be formed of various rounded shapes or of triangular section although the remainder of the rod may, for example, be rectangular. In the completed battery some of the connecting rods 16 may extend in a direction across the battery at right angles to the direction of other connecting rods.

In the above examples, the rod 16 is moved downwards into position in the partition walls. However, other arrangements are possible provided relative movement between the rod and the wall or walls is effected so as to embed the rod in the wall or walls. In one alternative, the rod may be held in a fixed position and the battery casing raised thereby moving the walls upwardly relative to the rod 16.

We claim:

1. A method of forming an intercell connection in an electric storage battery having at least two cell compartments separated from each other by planar wall means formed of thermoplastic plastics material and each containing a plurality of plates, comprising the ordered steps of: (a) connecting the plates of two adjacent cell compartments to opposite ends of a metal intercell connecting rod in electrical connection therewith, (b) positioning the rod across the top of the wall means with the plates projecting into their respective cell compartments, said connection between the plates and connecting rod being made out of the plane of the wall means (c) applying heat to the region of the wall means adjacent the connecting rod to soften the thermoplastic material, (d) causing relative movement between the rod and the wall means in a direction towards the top of the wall means and into the plane thereof so that the rod displaces softened thermoplastic plastics material and becomes embedded in the wall means, (e) terminating the relative movement when the plates and interconnecting rod have reached a required position, and (f) permitting the thermoplastic plastics material to cool and set to hold the rod in position and form a seal against the rod.

2. A method as claimed in claim 1 in which adjacent cell compartments are separated by a partition wall and the connecting rod is moved downwards in the partition wall to a position where the upper edge of the rod is below the upper edge of the partition wall and the space in the partition wall above the connecting rod when the rod has been moved down into position is sealed by suitable sealing means to a level flush with the top of the partition wall.

3. A method as claimed in claim 2 in which a cover of thermoplastic material is subsequently sealed to the battery casing, the cover including partition members which are welded to the upper edge of each associated partition wall in the casing, thereby sealing adjacent cells from each other.

4. A method as claimed in claim 1 in which the connecting rod is formed with a groove or recess around at least part of its periphery adjacent the wall means so that the softened plastics material enters the groove and on setting, the plastics material forms a good seal against the rod around the groove or recess.

5. A method as claimed in claim 4 in which the groove or recess is arranged so that as the rod is moved downwards, softened plastics material which is displaced is caused to flow upwards through the groove to provide plastics material above the rod.

6. A method as claimed in claim 1 in which a mould is positioned around the rod and the wall means when the rod is caused to move downwards into the softened plastics material, the mould being shaped in dependence on the shape of the rod and thickness of the wall means so that softened plastics material which is displaced by the downward movement of the rod is caused to rise above the rod and enter the mould thereby providing a wall member above the rod flush with the top of the wall means and forming a complete seal around the connecting rod.

7. A method as claimed in claim 6 in which the heat to soften the thermoplastic plastics material is applied through the mould.

* * * * *